United States Patent [19]

Hoashi

[11] Patent Number: 5,091,198
[45] Date of Patent: Feb. 25, 1992

[54] COMPOSITE FOOD PRODUCTS AND THEIR PRODUCTION PROCESSES

[75] Inventor: Chikako Hoashi, Tokyo, Japan
[73] Assignee: Yugenkaisha Matsubei, Tokyo, Japan
[21] Appl. No.: 830,619
[22] Filed: Feb. 19, 1986

[30] Foreign Application Priority Data

Feb. 22, 1985 [JP] Japan .................................. 60-34102

[51] Int. Cl.$^5$ ........................ A23L 1/325; A23L 1/20; A22C 25/00
[52] U.S. Cl. ........................................ 426/92; 426/93; 426/94; 426/274; 426/282; 426/284; 426/297; 426/643; 426/646
[58] Field of Search ..................... 426/92-94, 426/104, 274, 282, 284, 297, 643, 644, 646

[56] References Cited

U.S. PATENT DOCUMENTS

| | | | |
|---|---|---|---|
| 3,950,550 | 4/1976 | Katayama et al. | 426/94 |
| 3,978,244 | 8/1976 | Sair | 426/634 X |
| 4,196,222 | 4/1980 | Cheney | 426/104 X |
| 4,200,959 | 5/1980 | Cheney | 426/104 X |
| 4,279,932 | 7/1981 | Koshida et al. | 426/92 X |
| 4,309,450 | 1/1982 | Seibert | 426/92 |

FOREIGN PATENT DOCUMENTS 377766  8/1932  United Kingdom ................ 426/284

OTHER PUBLICATIONS

Nonaka et al. Shinban Suisan Shokuhingaku (Marine Food Science, Revised Edition), published by Kouseisha Kouseikaku K.K., 1976; p. 217, line 6 from bottom, to p. 218, last line, (English translation).

*Primary Examiner*—Joseph Golian
*Attorney, Agent, or Firm*—Beveridge, DeGrandi & Weilacher

[57] ABSTRACT

Novel composite food products comprising a first, soybean protein-based food material and a second, minced meat-based food material which are bonded to each other, and their production processes are disclosed. These food products have any desired shapes. These food products have remarkably improved texture and taste in addition to a moderate heaviness when eaten.

15 Claims, 3 Drawing Sheets

COMPOSITE FOOD PRODUCTS AND THEIR PRODUCTION PROCESSES

BACKGROUND OF THE INVENTION

1. Field of the Invention

The present invention relates to food products. More particularly, the present invention relates to novel composite food products comprising two different food materials. One of the food materials is based on soybean protein. Another food material is based on a mince of meat such as a fish meat, chicken or broiler, or other meats. These composite food products have remarkably improved, interesting textures and taste in addition to a moderately controlled heaviness when they are eaten. The present invention also relates to the production processes for the above-described composite food products.

2. Description of the Prior Art

Now, a variety of Japanese food products which contain minced fish meat as a principal component, for example, "kamaboko" (boiled fish paste), "satsuma-age" (fried kamaboko or fried fish ball) or others are widely produced in the field of the food industry. Satsuma-age is typically produced by mixing the minced fish meat with a common salt, starch, sugar chemical seasonings and other additives, molding the mixture using any conventional machine, and finally frying the molded fish meat having any desired shape in an edible oil at a temperature of about 180° C.

In addition to the minced fish meat-based food products, many types of soybean protein-based food products are also widely produced in Japan. They include "tofu" (soybean curd), "abura-age" (fried twice), "nama-age" (fried tofu) and "ganmodoki" (fried tofu with mixed vegetables), for example. A typical example for the production of the abura-age comprises the steps of preparing a relatively hard tofu, slicing the tofu, and frying drained slices of the tofu in an edible oil.

Both of the minced fish meat-based food products and the soybean protein-based food products provide good taste and therefore are frequently used in cooking in Japan and recently in other countries, but they suffer from some drawbacks.

For example, the satsuma-age generally tends to lie heavy on the stomach due to its dense texture. In contrast, while the abura-age has a soft texture, it is very light due to its spongy body and therefore necessitates to take an excessively high amount of the same to satisfy eater's appetite. It is, therefore, desired to provide an improved food product having an excellent texture and taste as well as a moderate heaviness in eating, and a process for the production of such food product.

SUMMARY OF THE INVENTION

According to the present invention, there is provided a novel composite food product comprising a first food material which contains soybean protein as a principal component and is a heated and foamed solid material of the soybean protein-containing composition, and a second food material which contains minced meat as a principal component and is a heated and solidified material of the minced meat-containing composition.

According to the present invention, there is also provided a process for the production of the above novel composite food product which comprises a first, soybean protein-based food material and a second, minced meat-based food material. The production process of the present invention comprises the steps of:

preparing a soybean protein-containing composition and a minced meat-containing composition;

molding each of the soybean protein-containing composition and the minced meat-containing composition to any desired shape;

bonding the molded products to form an integral structure; and heating the resulting integral structure.

As is well known in the art, the soybean protein is one separated from soybeans in accordance with conventional manners and includes soybean isolate and similar soybean protein products. The soybean isolate can be optimally used as the soybean protein, but, if desired, it may be replaced with defatted soybean meal (soymeal) or soymeal concentrates. These soybean protein products are preferably in the form of powders.

Any type of minced meant can be used as a principal component of the second food material of the present composite food product, insofar as it does not adversely affect desired characteristics of the composite food product and its production process. The minced meat used herein includes minces of butcher's meat such as beef, pork or mutton, poultry meat such as chicken, broiler, duck or turkey, and fish meat such as codfish, croaker, shark for example. As an alternate, these meat can be preferably incorporated into the second food material without mincing. The fish meat and the chicken or broiler can be optimally used as the meat of the second food material.

The composite food products according to the present invention can provide an excellent and various texture as a result of combination of two different textures, namely, a soft texture of the first food material based on the foamed soybean protein products and a hard or dense texture of the second food material based on the hardened minced meat. Further, unexpectedly, a taste of the first food material and that of the second food material can be optimally harmonized, thereby conferring on the present composite food products various and interesting taste which have not ever been experienced. Furthermore, a design of the present food products can be easily and optionally changed depending upon desires, utilizing a foaming property of the soybean protein products forming the first food material. This is because a bonded structure of the first and second food materials is subjected to a thermal treatment, the first food material foams and expands, but the second food material does not exhibit such behaviors.

The composite food products of the present invention can be eaten with or without further conventional treatments such as heating, boiling, cooking, broiling, frying or other treatments. As an example, they can be used as an ingredient in cooking of "oden" (Japanese hotchpotch) or can be added to soup of the noodles such as "udon" (flour noodle) or "soba" (buckwheat noodle). In any case, they have a variety of significant uses in the field of the food industry.

DESCRIPTION OF THE PREFERRED EMBODIMENTS

Figure 1:
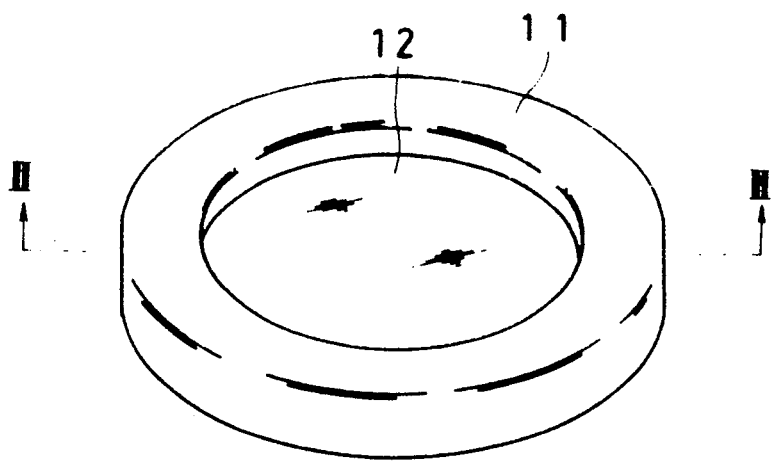
FIG. 1 is a perspective view of the composite food product according to an embodiment of the present invention.

In the practice of the present invention, a soybean protein-containing composition is used to form the first food material. The soybean protein-containing composition is preferably in the form of a paste which can be prepared by blending powdered protein isolate with a vegetable oil and water, for example. A preferred blending ratio of the protein isolate, vegetable oil and water is in the range of about 1:0.3 to 4.0:3.0 to 5.0. The powdered protein isolate is commercially available from Fuji Seiyu Kabushiki Kaisha under the trade name "FUJIPRO R". Alternatively, in place of the protein isolate, powdered defatted soybean meal (soymeal), powdered soymeal concentrate or other soybean proteins can be effectively used as a resource material for the first food material. Also, the soybean protein-containing composition can be prepared by crushing the tofu or soybean curd and adding thereto cuts of yam or others, if desired.

As previously described, fish meat or its minced one is preferably used as a principal component of the second food material. Typical examples of useful fish meat include codfishes such as Theragre chalc cogramma, croakers, sharkes such as glyphis glaucus, bastard halibut, yellow fish (akta mackerel) or other resource fishes. The fish meat-containing composition used in the formation of the second food material can be preferably prepared by mixing the chosen fish meat, singly or in combination, with any suitable additives such as a vegetable oil, a common salt, starch, sugar, seasonings, particularly chemical seasonings, for instance, monosodium glutaminate, or water using any conventional agitator or kneader. In this case, the addition of the vegetable oil is particularly recommended, because it tends to more soften the texture of the resulting food product. The vegetable oil can be suitably added to the composition in an amount of about 10 to 30% by weight base on the total amount of the composition.

Further, a variety butcher's meat or poultry meat or its minced one is preferably used as a principal component of the second food material, too. A typical example of useful type of meat for this purpose is chicken or broiler, especially its white meat. The chicken- or other meat-containing composition used in the formation of the second food material can be preferably prepared by mixing the chosen meat or its mince with any appropriate additives such as a common salt, pepper, sage, ginger root, water or others with agitation. During agitation, yam, alubument or other foaming agents may be added to the mixture to form a plurality of fine foams in the resulting meat-containing composition. Such a formation of the foams in the composition is effective to obtain a second food material with soft texture, upon heating and solidifying of the composition. In addition to these additives, other conventional ingredients and additives such as fine strips of the vegetables or sea grass may be also added to the meat-containing composition to modify or improve a taste of the food material. If desired, this type of meat may be used in combination with one or more of the fish meats discussed above.

After the preparation of each of the soybean protein-containing composition and the minced meat-containing composition, the resulting compositions are molded using conventional molding machines or, alternatively, specially designed molding machines depending upon the desired shape of the food products. For example, these compositions can be separately molded using the same or different molding machines. Preferably, they can be concurrently molded and bonded using a signal extrusion molding machine with two or more nozzle openings, optimally two concentrically disposed cylinder nozzle openings, for example. the molded and bonded products can be preferably cut to a desired thickness using a cutting means positioned just before the nozzle openings of the molding machine. An integral structure corresponding to the desired shape of the composite food product is resulted after the molding and bonding steps have been completed.

Finally, the resulting integral structure consisting of two molded food material is subjected to a thermal treatment. The thermal treatment can be preferably carried out by frying the integral structure in oil at a higher temperature. More preferably, it can be sequentially carried out in two stages, namely, a first frying stage at an oil temperature of about 100° to 120° C. for about 5 to 10 minutes and a second frying stage at an oil temperature of about 160° to 180° C. for about 1 or 2 minutes. In the first frying stage, each of the two food materials forming the integral structure is thermally modified and solidified. Next, in the second frying step, both food materials expand and result in scorching of their outer surface to a beautiful brown color. After taking the fried integral structure from the oil bath, the first, soybean protein-based food material maintains its expanded state, but the second, minced meat-based food material reduces its volume to approximately the original one due to its shrinkage.

In addition to frying, the thermal treatment for the integral structure can be carried out using conventional electronic ranges or ovens. The selection of the heating means will depend on various factors such as a shape of the final product and particulars of each of the first and second food materials.

The thus resulting composite food products of the present invention have various shapes. For example, they may comprises a disc-shaped inner portion of the second food material having bonded to an outer surface thereof a ring-shaped outer portion of the first food material. In another embodiment of the composite food products, a layer or plate of the second food material may be sandwiched with two layers or plates of the first food material. In still another embodiment, the composite food products of the present invention may comprise a trapezoid second food material having bonded to a side or other surface thereof a rod-shaped first food material. Further, they may be in the form of a cylindrical container, an inner portion of which is formed from the second food material and an outer portion of which is formed from the first food material. Furthermore, they may be in the form of a tubular bar, an inner tubular portion of which is formed from the second food material and an outer tubular portion of which is formed from the first food material.

In each of the composite food products, the first, soybean protein-based food material has a light and soft texture, because it was expanded and foamed upon heating in the thermal treatment step. In contrast, the second, minced meat-based food material has a dense and elastic texture as a result of gelation or integration of the same upon heating.

The composite food products and their production processes according to the present invention will be further described with reference to the following examples which, however, do not limit the scope of the present invention.

EXAMPLE 1

A soybean isolate, vegetable oil and water in a ratio of 1:1:3.3 were mixed to prepare a soybean protein-containing composition. The soybean isolate used herein as the soybean protein was "FUJIPRO R" (Trade name; products of Fuji Seiyu Kabushiki Kaisha). Separately, 32% by weight of meat of shark (glyphis glaucus), 32% by weight of codfish (theragre chalc cogramma), 20% by weight of vegetable oil, 2.5% by weight of a common salt, 9% by weight of starch, 4% by weight of sugar and 0.5% by weight of monosodium glutaminate as a seasoning were mixed to prepare a minced fish meat-containing composition.

Figure 3:
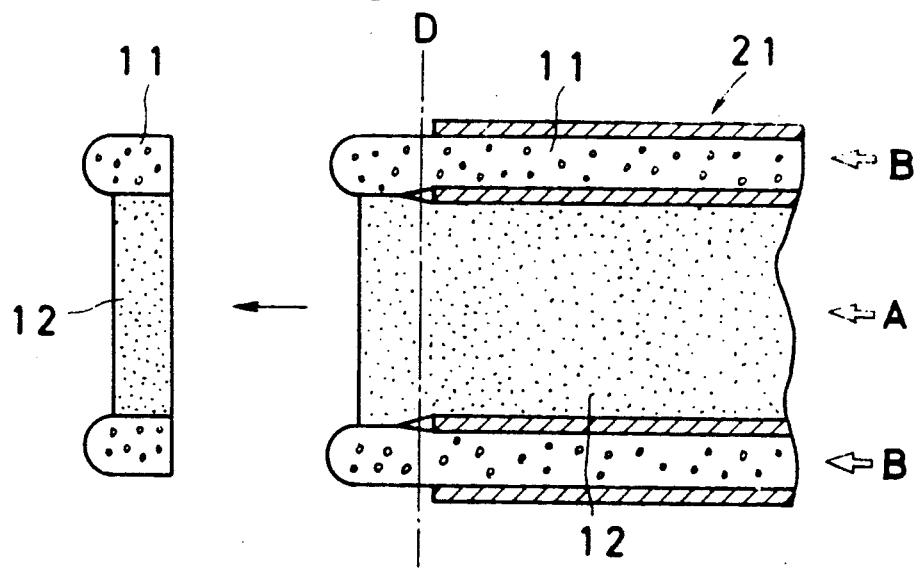
FIG. 3 is a cross-sectional view showing a molding step of the production process according to an embodiment of the present invention.

Thereafter, as is illustrated in FIG. 3, the resulting soybean protein- and minced fish meat-containing compositions were concurrently extruded through two co-axial cylinder nozzle openings of the extrusion molding machine 21. The soybean protein-containing composition 11 was extruded through an outer ring-shaped nozzle under the extrusion pressure "B", while the minced fish meat-containing composition 12 was extruded through an inner cylindrical nozzle under the extrusion pressure "A" which is lower than the pressure "B". The extruded compositions having an integral structure was then cut at a position of line D using a conventional cutter (not shown). The molded and cut integral structure in the form of disc has a thickness of about 2 cm.

Figure 4:
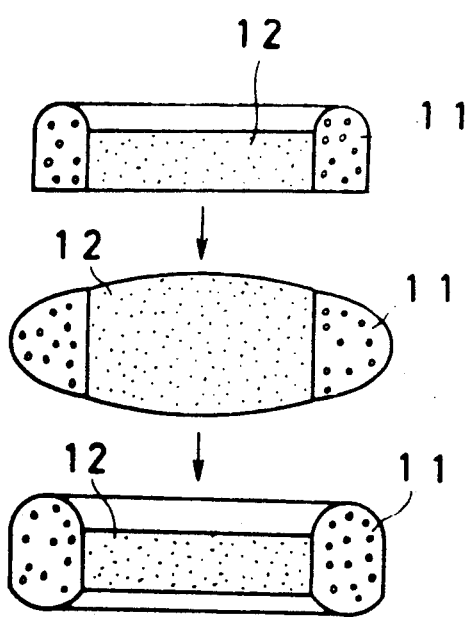
FIG. 4 is a cross-sectional view showing, in sequence, a frying step of the production process according to an embodiment of the present invention.

Cut pieces of the molded integral structure were first fried in a vegetable oil at 100° to 120° C. for 7 minutes, and further fried in the oil at 160° to 180° C. for 1.5 minutes. A shape of each piece of the integral structure was changed as is shown in FIG. 4. After the first frying at 100° to 120° C., the piece of the integral structure was hardened due to its thermal modification, but did not expand and maintained its original shape (FIG. 4(a)). When the piece was further fried at 160° to 180° C., both of the first soybean protein-based food material 11 and second, minced fish meat-based food material expanded as is shown in FIG. 4(b). In addition to the expansion, an outer surface of the piece scorched and did to a light brown. After the two frying stages have been completed, the piece was taken from the oil and was left to stand. As a result of cooling, the fish meat-based food material 12 of the piece shark returned to its original shape, while the soybean protein-based food material 11 maintained its expanded shape (FIG. 4(c)).

Figure 2:
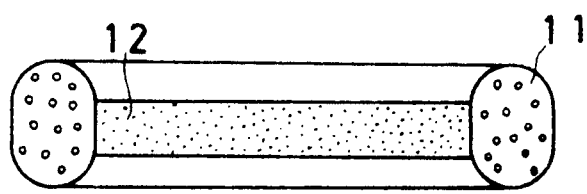
FIG. 2 is a cross-sectional view of the composite food product taken along line II—II of FIG. 1.

The thus produced composite food product has a perspective view of FIG. 1 and a cross-sectional view of FIG. 2. It is apparent from these drawings that the illustrated composite food product comprises a disc-shaped, fish meat-based food material 12 and a ring-shaped, soybean protein-based food material 11 bonded to an outer peripheral surface of the food material 12. The expanded food material 11 has a light and soft texture and, in contrast to this, the non-expanded food material 12 has a dense and elastic texture. Moreover, this food product has a remarkably improved and interesting taste because of the combination of the taste of the soybean protein provided by the food material 11 and that of the fish meat provided by the food material 12.

EXAMPLE 2

Figure 5:
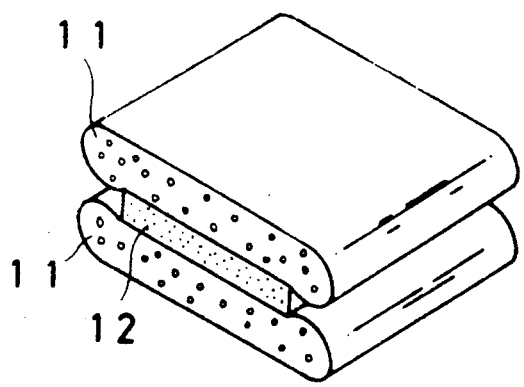
FIG. 5 is a perspective view of the composite food product according to another embodiment of the present invention.
Figure 6:
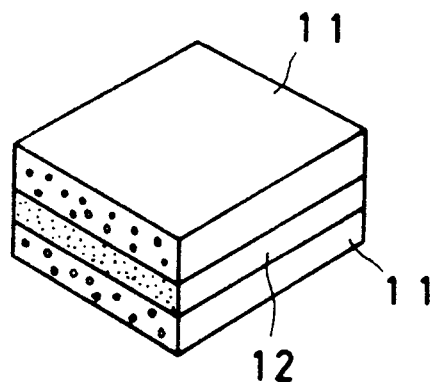
FIG. 6 is a perspective view of the composite food product of FIG. 5 which has not yet been fried.

A soybean protein-containing composition used herein was the same as that of Example 1 described above. A minced meat-containing composition was prepared by mixing 1 kg of white meat of chicken, 10 g of salt, 2 g of a chemical seasoning: monosodium glutaminate, 20 g of sugar, 2 g of a foaming agent: "FOAM-UP" (Trade name; products of Riken Vitamin Kabushiki Kaisha), 6 g of a foaming agent: "SK 5" (Trade name; Kaihatsu Kagaku Kabushiki Kaisha), 300 g of albumen and 200 g of ice. After each of the soybean protein- and minced chicken-containing compositions was molded to a plate of the food material, a plate of the minced chicken-based food material was sandwiched with two plates of the soybean protein-based food material. A three-layered integral food material as is illustrated in FIG. 6 was obtained, in which 11 is the soybean protein-based food material and 12 is the minced chicken-based food material. The integral food material was then fried in the vegetable oil in accordance with the manner similar to that of Example 1: the fried integral food material, i.e., integral food product is illustrated in FIG. 5. It is apparent from this illustration that the expanded, soybean protein-based food material 11 covers a part of both side surfaces of the minced chicken-based food material 12. Accordingly, during eating, a dense and elastic layer of the food material will be exposed in a light and soft layer of the food material which is different from that of said dense layer. This means a various texture and excellent taste of the integral food product.

EXAMPLE 3

Figure 7:
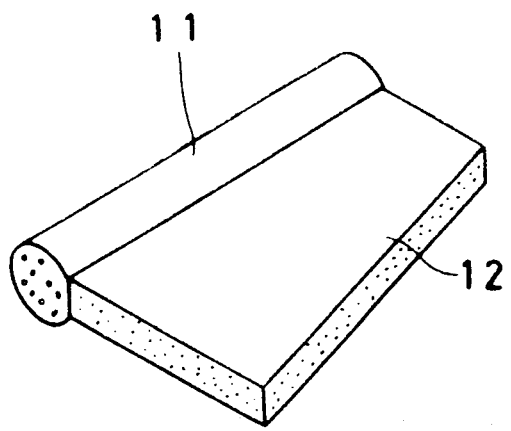
FIGS. 7, 8 and 9 each is a perspective view of the composite food product according to further embodiments of the present invention.

A soybean protein-containing composition was prepared as in that prepared in Example 1, and was molded into a rod-shaped food material. Similarly, a minced fish meat-based composition was prepared as in Example 1, and then molded into a trapezoid food material. Then, the rod-shaped, soybean protein-based food material 11 was bonded to a side surface of the trapezoid, minced fish meat-based material 12 to form a composite food product as is shown in FIG. 7. The food product was then fried as in Example 1. The fried composite food product having such a shape as a steak exhibited an interesting texture and taste.

EXAMPLE 4

Figure 8:
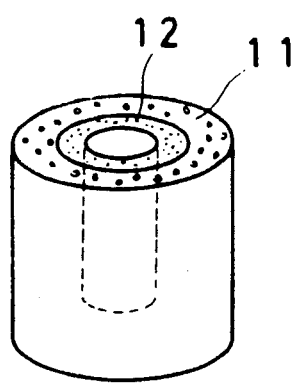

Using the soybean protein- and minced fish meat-based food materials prepared as in Example 1, a composite food product in the form of a cylindrical container was molded. The composite food product, as is illustrated in FIG. 8, comprises an inner portion of the minced fish meat-based food material 12 and an outer portion of the soybean protein-based food material 11. The food product was then fried as in Example 1. Due to different food materials, the fried composite food product exhibited two different textures, i.e., an outer soft texture and an inner dense texture. Further, the food product resulted in an increase of the variedness of the taste, when grated radish, long thin strips of carrots or other daily dishes were added in the container of the food product.

EXAMPLE 5

Figure 9:
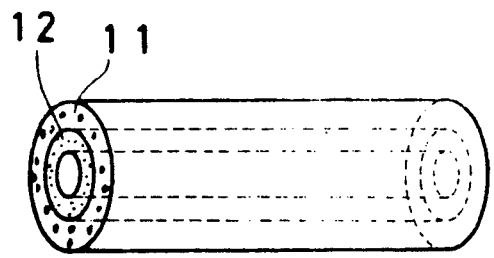

Using the soybean protein- and minced fish meat-based food materials prepared as in Example 1, a composite food product in the form of a tubular bar with two open ends such as "chikuwa" (fish stick) was molded. The composite food product, as is illustrated in FIG. 9, comprises an inner tubular portion of the minced fish meat-based food material 12 and an outer tubular portion of the soybean protein-based food material 11. The composite food product was then fried as in Example 1. The fried composite food product exhibited an excellent texture and taste, because it has two different materials and textures, i.e., an outer soybean protein-based material with soft texture and an inner, fish meat-based material with dense texture.

I claim:

1. A heat treated food product comprising
a solidified, molded, first food material derived from a soybean protein-containing paste composition which comprises a soybean isolate in admixture with vegetable oil and water that expands on heating by frying in edible oil;
a solidified, molded, second food material bonded to the first material in a texturally integral form, wherein the second food material is derived from a salt-minced fish meat-containing composition that expands on heating by frying in edible oil;
and wherein the first food material has been expanded on heat treatment more than the second food material on heat treatment of the bonded food materials by frying in edible oil.

2. A food product as in claim 1 in which said minced meat-containing composition comprises fish meat in admixture with a common salt, water, vegetable oil, starch, sugar, or seasonings.

3. A food product as in one of claims 1 or 2 in which said food product comprises a disc-shaped inner portion of the second food material having bonded thereto a ring-shaped outer portion of the first food material.

4. A food product as in one of claims 1 or 2 in which a layer of the second food material is sandwiched between two layers of the first food material.

5. A food product as in one of claims 1 or 2 in which said food product comprises a trapezoid second food material having bonded to a side or other surface thereof a rod-shaped first food material.

6. A food product as in one of claims 1 or 2 in which said food product is in the form of a cylindrical container, an inner portion of which is formed from the second food material and an outer portion of which is formed from the first food material.

7. A food product as in one of claims 1 or 2 in which said food product is in the form of a tubular bar, an inner tubular portion of which is formed from the second food material and an outer tubular portion of which is formed from the first food material.

8. A food product as in one of claims 1 or 2 in which the salt-minced fish meat-containing composition has a vegetable oil content of about 10 to 30% by weight based on the total amount of the fish-meat containing composition.

9. A process for the production of a food product comprising a first, soybean protein-based food material and a second, salt-minced fish meat-based food material bonded to the first food material, which process comprises the steps of:
preparing a moldable soybean protein-containing paste composition which is prepared by mixing a soybean isolate with vegetable oil and water;
preparing a moldable, salt-minced fish meat-containing composition;
molding each of the soybean protein-containing composition and the salt-minced fish meat-containing composition;
bonding the resulting molded compositions to form a first integral structure; and
heating the first integral structure to fry in edible oil to form a hardened second integral structure;
heating said hardened integral structure to fry in edible oil at a higher oil temperature to expand said hardened structure;
wherein the first food material expands on heating more than the second food material so that the resulting hardened and expanded second integral structure has a shape that is different from the first integral structure.

10. A production process as in claim 9 in which the minced meat-containing composition is prepared by mixing fish meat with common salt, water, vegetable oil, starch, sugar, or seasonings, and mincing the mixture.

11. A production process as in one of claims 9 or 10 in which the soybean protein-containing composition and the minced meat-containing composition are separately molded using the same or different molding machines.

12. A production process as in one of claims 9 or 10 in which the soybean protein-containing composition and the minced meat-composition are concurrently molded and bonded using a single extrusion molding machine.

13. A production process as in one of claims 9 or 10 in which frying is sequentially carried out at first oil temperature of 100° to 120° C. and at a second oil temperature of 160° to 180° C.

14. A production process as in one of claims 9 or 10 in which preparing the salt-minced fish meat-containing composition further comprises adding a vegetable oil to the composition in an amount about 10 to 30% by weight based on the total amount of the fish meat-containing composition.

15. A production process as in claim 12 in which the said soybean protein-containing and salt-minced fish meat-containing compositions are concurrently extrusion molded through two concentrically disposed cylinder nozzle openings of the extrusion molding machine in which the soybean protein-containing composition is extruded through an outer ring-shaped nozzle under an extrusion pressure "B" while the salt-minced fish meat-containing composition is extruded through an inner cylinder nozzle under an extrusion pressure "A" which is lower than the pressure "B".

* * * * *

UNITED STATES PATENT AND TRADEMARK OFFICE
CERTIFICATE OF CORRECTION

PATENT NO.   :  5,091,198
DATED        :  2/25/92
INVENTOR(S)  :  Chikako Hoashi It is certified that error appears in the above-identified patent and that said Letters Patent is hereby corrected as shown below:

Column 7, line 30, delete "in a texturally integral form";

line 41, delete "or" and insert therefor --and--.

Column 8, line 31, delete "or" and insert therefor --and--.

Signed and Sealed this

Sixth Day of July, 1993

Attest:

MICHAEL K. KIRK

*Attesting Officer*   *Acting Commissioner of Patents and Trademarks*